United States Patent [19]

Waer et al.

[11] 4,012,737
[45] Mar. 15, 1977

[54] PSEUDONOISE GUIDANCE SYSTEM WITH SPILLOVER REJECTION

[75] Inventors: Richard Roland Waer; Ernest Isaac Rensin, both of Northridge, Calif.

[73] Assignee: International Telephone and Telegraph Corporation, New York, N.Y.

[22] Filed: Oct. 19, 1970

[21] Appl. No.: 81,815

Related U.S. Application Data

[63] Continuation-in-part of Ser. No. 670,730, Sept. 26, 1967, abandoned.

[52] U.S. Cl. .............................. 343/17.5; 325/349; 325/473
[51] Int. Cl.² ......................................... G01S 9/02
[58] Field of Search .......... 343/17.5; 325/344, 349, 325/473

[56] References Cited
UNITED STATES PATENTS
3,205,443    9/1965    Ludwig ............................ 325/344

Primary Examiner—T.H. Tubbesing
Attorney, Agent, or Firm—William T. O'Neil

[57] ABSTRACT

A device for rejecting spillover from a pseudonoise, continuous wave radar transmitting antenna. Spillover is the energy transmitted directly from transmitter to receiver. It is undesirable and must be suppressed in order to be able to sense the desired reflected wave from a target. Suppression is accomplished by decoding the spillover at the receiver antenna range from the transmitting antenna. The desired signal is not decoded because the desired signal has a code corresponding to target range. The target signal, thus, remains broadband whereas the spillover is reduced simply to a single frequency larger than zero or equal to zero (direct current). A notch filter or a high pass filter or direct current blocking capacitor may then be used to pass the target signal and block the spillover.

19 Claims, 9 Drawing Figures

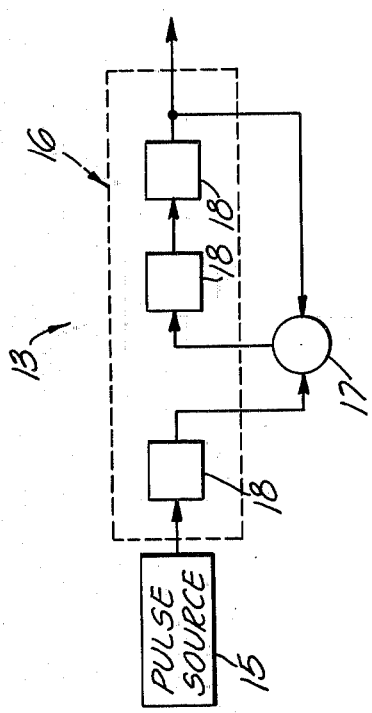
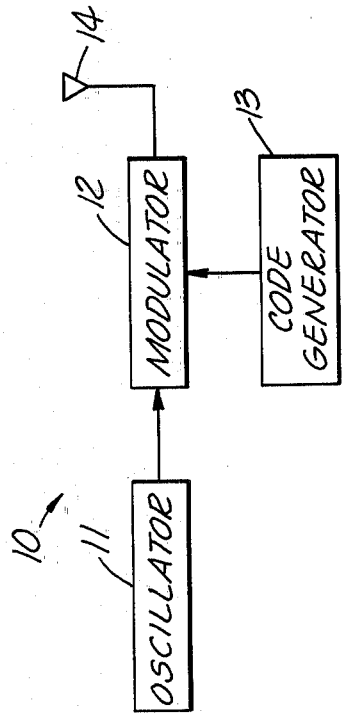
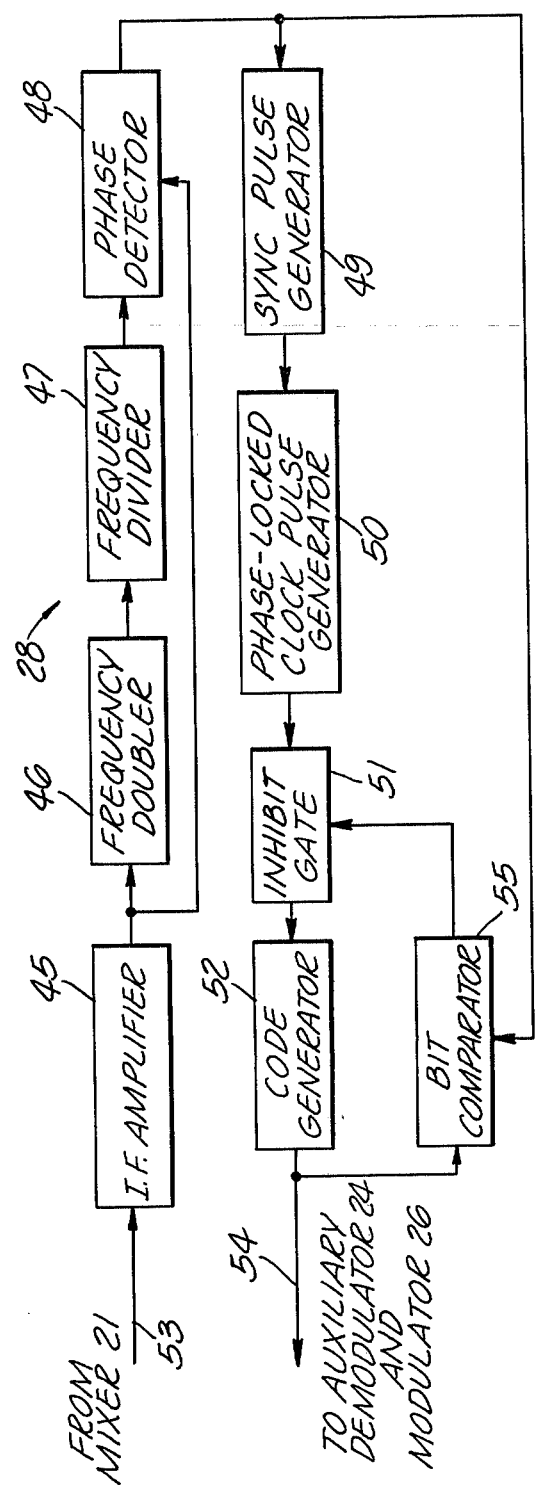

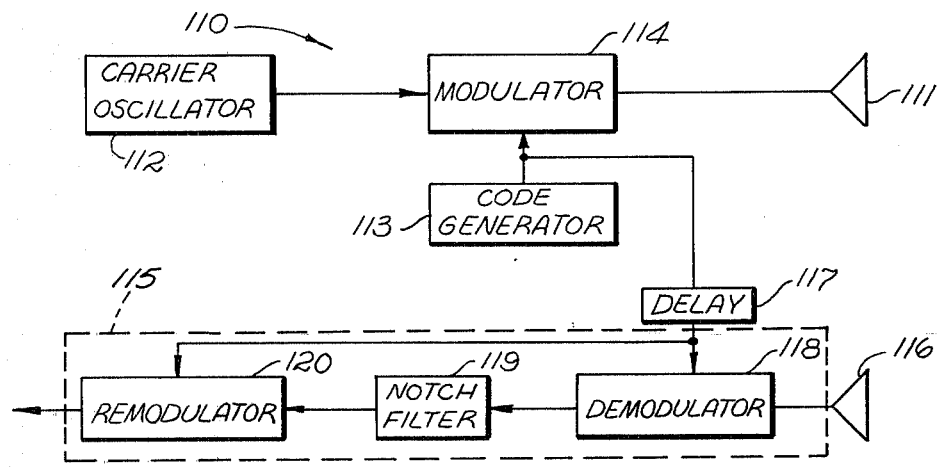
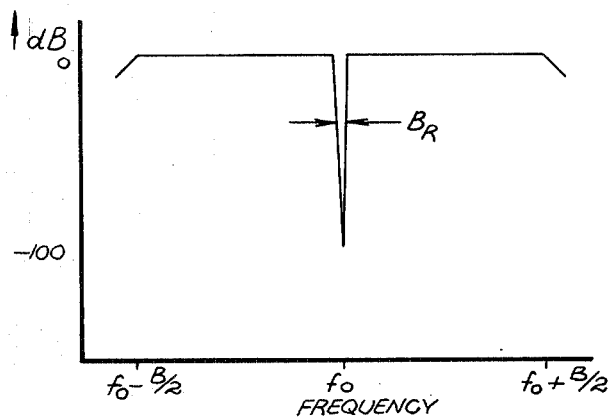
Fig. 7.
SPILLOVER REJECTOR—
NOTCH FILTER RESPONSE.
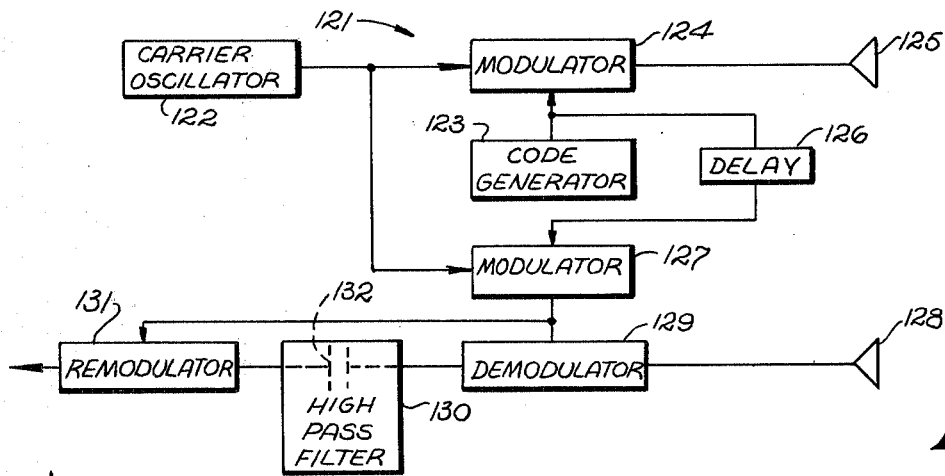
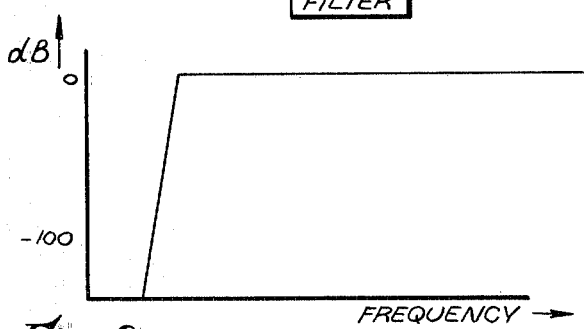
Fig. 9. SPILLOVER REJECTOR—
HIGH PASS FILTER RESPONSE.
INVENTORS.
RICHARD R. WAER
ERNEST I. RENSIN
BY.
ATTORNEY.

4,012,737

PSEUDONOISE GUIDANCE SYSTEM WITH SPILLOVER REJECTION

BACKGROUND OF THE INVENTION

This application is a continuation-in-part of copending application Ser. No. 670,730 filed on Sept. 26, 1967, by Richard R. Waer and Ernest I. Rensin for a "Pseudo-noise Guidance System with Spillover Rejection." The benefit of the filing date of said application, now abandoned, therefore, is claimed for this application.

This invention relates to pseudonoise modulation systems and, more particularly, to means for distinguishing between electromagnetic energy received directly from a transmitter or reflected from nearby objects and electromagnetic energy reflected from a distant target.

The system of the present invention will have a wide variety of uses. Thus, it should not be limited to any specific application disclosed herein. For example, it may be employed in a strictly voice or other communication system. Nevertheless, the invention has been found to possess exceptional utility in a pseudonoise guidance system for a surface-to-air missile interceptor. In such a case, generally a surface-based continuous wave (CW) radar transmitter or the like radiates a coded radio frequency signal which is reflected by a distant target such as an aircraft. The signal is then reflected from the target and received by a receiver on board the missile.

A serious problem has occurred in such prior art systems due to interference which is created by direct transmission of an unreflected wave from the transmitter to the receiver. This interference is called "spillover" or "spillover noise." Initially, the transmitter is usually located a much shorter distance from the receiver than the target is. Thus, the signal strength of spillover is considerably greater than that of the signal reflected from a distant target. Still further, since the reflected signal must travel both to and from the target, the signal strength of the reflected signal is placed even further below that of spillover because spillover travels directly or nearly directly from transmitter to receiver and not to the target and back to the receiver again.

SUMMARY OF THE INVENTION

In accordance with the system of the present invention, the above-described and other disadvantages of the prior art are overcome by providing first means for collapsing a substantial portion or all of the electromagnetic energy in the spillover spectrum to an intemediate signal of substantially a single frequency while, at the same time, leaving the desired signal energy broadbanded, and second means adapted to receive the intermediate signal and the broadband desired signal from the output of the first means, the second means being adapted to attenuate the intermediate signal selectively without substantially attenuating the desired signal energy.

One embodiment of the spillover rejector of the present invention utilizes a notch filter to suppress the spillover. In another embodiment, a high pass filter or a single direct current blocking capacitor is employed. The capacitor may, by its own simplicity, be by far the least expensive device for a large number of applications.

One embodiment of the spillover rejector of the present invention may include an auxiliary demodulator, a notch filter, and a modulator connected in succession from the receiver output to an output system for decoding signals reflected from distant targets. The spillover rejector can also include an auxiliary decoder which operates both the auxiliary demodulator and the modulator.

Normally, the transmitter has an oscillator which provides a signal relatively pure in frequency. When the transmitter oscillator output signal is coded, the energy of the signal radiated from the transmitter is spread out in a relatively large band of frequencies. The auxiliary decoder includes a code generator synchronized so as to demodulate the incoming signal according to the transmitter code. The transmitter code is conventionally a serial binary code which is periodically repeated. The auxiliary decoder reproduces an identical code in the proper time phase to decode spillover. However, due to the fact that the output code of the auxiliary decoder is not in the proper time phase to decode signals from the distant targets, these signals pass through the auxiliary demodulator with an additional coding.

The auxiliary demodulator converts the wideband coded spillover back to a signal within a narrow band of frequencies corresponding to the output of the transmitter oscillator. The notch filter then heavily attenuates the reconstructed narrow band of the spillover energy. The notch filter also attenuates some of the energy within the double coded broadband received due to target reflection. However, the energy is distributed over such a wide band that the amount of energy removed from the said broadband by the notch filter is very small in comparison to the total energy in the entire broadband. The modulator then, in effect, demodulates the second coding placed on the incoming signal by the auxiliary demodulator. The output of the modulator is then representative of the incoming energy with the spillover removed. The output of the modulator is then decoded and used for guidance purposes.

By using one additional modulator, it is possible to reduce the said single frequency to zero, which is direct current. Thus, a high pass filter or a single direct current blocking capacitor may be employed to suppress spillover. For use in this entire application including but not limited to all the description and all the claims, the word "single frequency" is hereby defined to include any frequency including zero frequency. Zero frequency is hereby defined as the frequency of signal which is a direct current or a direct current voltage.

The above-described and other advantages of the present invention will be better understood from the following description when considered in connection with the accompanying drawings.

BRIEF DESCRIPTION OF THE DRAWINGS

In the drawings, which are to be regarded as merely illustrative:

FIG. 1 is a block diagram of a transmitter for a pseudonoise guidance system;

FIG. 2 is a block diagram of a code generator shown in FIG. 1;

FIG. 4 is a block diagram of an auxiliary decoder shown in FIG. 3;

FIG. 6 is a block diagram of another pseudonoise (PN) radar system constructed in accordance with the present invention;

FIG. 7 is a graph of the attenuation versus frequency characteristic of a notch filter for use in the system of FIG. 6;

FIG. 8 is a block diagram of still another PN radar system of the present invention; and FIG. 9 is a graph of the attenuation versus frequency characteristic which the high pass filter shown in FIG. 8 may have.

DESCRIPTION OF THE PREFERRED EMBODIMENT

Figure 3:
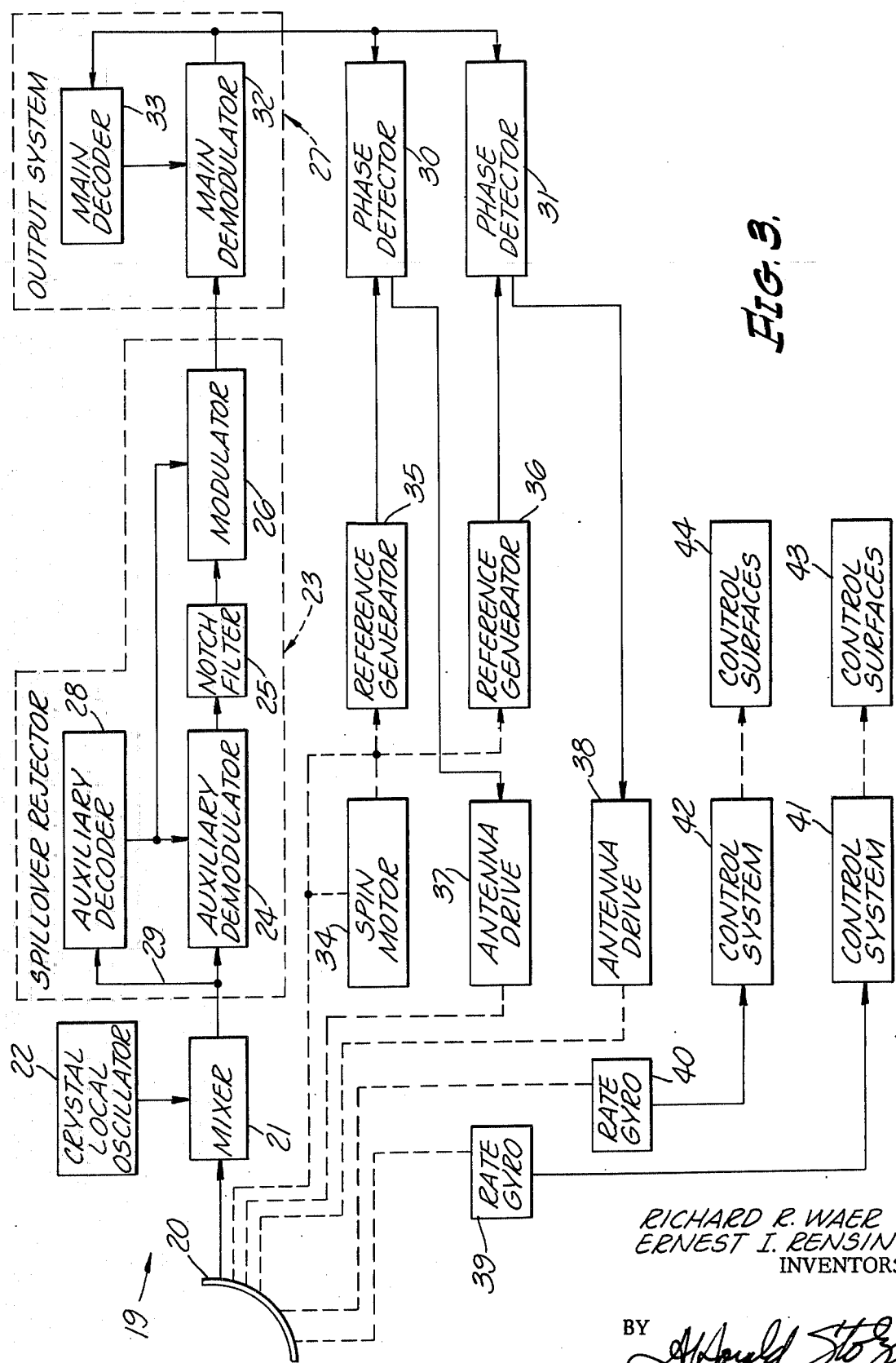
FIG. 3 is a block diagram of one form of a receiver constructed in accordance with the present invention for a pseudonoise guidance system utilizing spillover rejection.

In FIG. 1, a transmitter 10 of a pseudonoise guidance system is shown including an oscillator 11, a modulator 12, a code generator 13, and a transmitting antenna 14. The output of oscillator 11 is impressed upon modulator 12 and modulated thereby in accordance with the output of code generator 13 impressed thereupon. The output of modulator 12 is then transmitted via antenna 14.

Modulator 12 is a double-pole, double-throw electronic switch. Modulator 12 may be considered to have two input leads from oscillator 11 and two output leads to antenna 14 which are respectively connected to each other in a predetermined order which is reversed in accordance with a binary output of code generator 13.

Transmitter 10, including each component thereof may be entirely conventional. For example, code generator 13 may be conventional as shown in FIG. 2.

In FIG. 2, code generator 13 comprises a pulse source 15 which supplies pulse inputs to a shift register 16. The output of shift register 16 is combined with one or more modulo-2 adders 17 connected between any one or more pairs of two adjacent bit positions 18 in the register. That is, one or more adders 17 may be supplied, if desired. Preferably, shift register 16 has three or several more bit positions 18. The output of shift register 16 is a serial binary code which is periodically repeated. This code is impressed upon modulator 12 in transmitter 10.

In accordance with the system of the present invention, a receiver 19 is provided as shown in FIG. 3.

In the operation of the pseudonoise guidance system of the present invention, transmitter 10 transmits the coded output of modulator 12 via antenna 14. Some of the electromagnetic energy transmitted by antenna 14 may be directly received through a receiving antenna 20. Alternatively, some of the energy transmitted by antenna 14 may be reflected off nearby objects. In either of these cases, the energy, thus, received through receiving antenna 20 may be described as noise.

Transmitter 10 may be located on board ship or on the ground, or in any other location required for use in an active or semi-active system. Receiver 19 may be located on board a missile to be guided.

For purposes herein, the term "spillover" or the phrase "spillover noise" is hereby defined to include energy transmitted directly from antenna 14 to antenna 20 or reflected from objects close to the transmitter or receiver.

The said spillover noise tends to swamp receiver 19 because, especially at launch, spillover noise energy considerably exceeds any energy reflected from a distant target. In accordance with the system of the present invention, receiver 19 is constructed to reject the said spillover noise and to derive signals for guidance from energy reflected from a distant target.

Receiver 19 includes a mixer 21 to receive the radio frequency output of antenna 20. Mixer 21 mixes the output of a crystal local oscillator 22 with the output of antenna 20 and impresses an output on a spillover rejector 23. Spillover rejector 23 includes an auxiliary demodulator 24 to receive the output of mixer 21, a notch filter 25 to receive the output of demodulator 24, and a modulator 26 to receive the output of filter 25 and impress the same upon an output system 27.

Spillover rejector 23 also includes an auxiliary decoder 28 which supplies a serial binary code to demodulator 24 and modulator 26 which is identical in each case. Decoder 28 receives the output of mixer 21 on a lead 29 and thereby is synchronized with the code of the incoming spillover signal impressed thereupon by transmitter code generator 13. However, decoder 28 is constructed, as will be described, to operate synchronously only upon coded spillover energy rather than coded energy reflected from a distant target. Decoder 28, thus, makes it possible to favor spillover energy over the coded energy reflected from a distant target. As will be described, decoder 28 is able to synchronize to the spillover component supplied to it because the spillover energy has a considerably higher signal strength than that of target energy.

Auxiliary demodulator 24 decodes the spillover energy. Due to the fact that coding expands the transmission band considerably and distributes the power thereof over a wide band of frequencies, in order to develop a strong, narrow band receiver signal, decoding is required.

Modulator 12 and demodulator 24 perform inverse functions. The effect of demodulator 24 is to relocate the received spillover energy back in the relatively small band in which it was located at the output of oscillator 11. The energy in this small band is heavily attenuated by notch filter 25.

Modulator 26 in a way is a demodulator because it removes the additional coding placed on all of the received energy except spillover by demodulator 24. Thus, in a way, demodulator 24 is a modulator of the received energy other than spillover energy.

Removal of the target energy coding provided by demodulator 24 is necessary because the output of decoder 28 is not in the proper time phase with the code of any incoming target reflection. Thus, modulator 26 in effect returns the received signal to the form in which it is received by antenna 20 without spillover noise.

Notch filter 25 does not substantially attenuate target reflection because demodulator 24 does not decode target energy and locate it within the narrow attenuation band thereof. In other words, that portion of the output of modulator 24 which contains target energy remains in a relatively large band of frequencies; whereas, the portion of the output of demodulator 24 which contains spillover energy is in a relatively small band. Thus, notch filter 25 removes only a small central portion of the wide band target energy which appears at the output of demodulator 24.

Output system 26 receives an input from spillover rejector 23 and provides an output signal for phase detectors 30 and 31, which in turn, provide outputs for antenna servoing and attitude servoing of a missle. Output system 27 includes a main demodulator 32 which receives the output of modulator 26 and provides an identical input to each of the phase detectors 30 and 31. Output system 27 also includes a main decoder 33 which has a feedback from the output of main demodulator 32 to control main demodulator 32 to decode the ouput of modulator 26.

Antenna 20 is constructed to provide a conical scan. That is, boresight of the antenna 20 is disposed at an acute angle with respect to its spin as driven by a spin motor 34. Antenna 20 is further supported in gimbals as is conventional.

Should the output of transmitter oscillator 11 be relatively pure in frequency or of a single frequency, the output of main demodulator 32 would be substantially the same as the output of oscillator 11. The conical scan of antenna 20 produces a substantially sinusoidal amplitude modulation of the output of main demodulator 32. This output is compared in phase detectors 30 and 31 with references from reference generators 35 and 36 which produce sine waves ninety electrical degrees out of phase with each other.

Reference generators 35 and 36 may be simply tachometer generators appropriately connected from the spin motor 34. More often than not, the the outputs of reference generators 35 and 36 are provided by a single, twophase permanent magnet reference generator. The outputs of phase detectors 30 and 31 are employed to operate antenna drives 37 and 38, respectively, to move antenna 20 in its gimbals to track a target. Rate gyros 39 and 40 are provided to detect the gimbal turning rates. Gyros 39 and 40 are respectively connected to control systems 41 and 42, which in turn, operate missile control surfaces 43 and 44 to servo the missle for intercept.

In the operation of the pseudonoise guidance system of the present invention, transmitter 10 transmits a coded output signal over a relatively wide band of frequencies. Some energy transmitted from transmitting antenna 14 is received directly by receiving antenna 20 while other energy is transmitted from antenna 14 to a target and then is reflected to antenna 20.

Local oscillator 22 and mixer 21, both of which are nominally conventional, perform their usual functions. Spillover rejector 23 then decodes and attenuates only the spillover energy and passes the remaining energy without considerable attenuation. Output system 27 then decodes the remaining energy output from spillover rejector 23, and phase detectors 30 and 31 control antenna drives 37 and 38 to servo the antenna 20 in position to track the target. At the same time, control surfaces 43 and 44 are operated through control systems 41 and 42 to guide the missile to intercept.

Auxiliary decoder 28 is shown in greater detail in FIG. 4. Auxiliary decoder 28 has successive stages including an IF amplifier 45, a frequency doubler 46, a frequency divider 47, a phase detector 48, a synchronizing pulse generator 49, a phase-locked clock pulse generator 50, and an inhibit gate 51, and a code generator 52. An input to IF amplifier 45 on a lead 53 is received from the ouput of mixer 21. The output of code generator 52 is on a lead 54 impressed upon both auxiliary demodulator 24 and modulator 26.

Phase detector 48 receives a second input directly from the output of amplifier 45 as well as from the output of frequency divider 47. A bit comparator 55 receives outputs from phase detector 48 and code generator 52 and operates inhibit gate 51 when the outputs of phase detector 48 and code generator 52 are not the same.

In the operation of the auxiliary decoder 28 shown in FIG. 4, amplifier 45 impresses the output of mixer 21 upon frequency doubler 46. The purpose of frequency doubler 46 and frequency divider 47 is to obtain a reference frequency independent of coding for phase detector 48. This reference frequency is the same frequency as that at the output of amplifier 45. However, it is not coded because the output of frequency divider 47 is independent of the phase reversal in the signal which is produced by transmitter code generator 13.

Phase detector 48 then produces a rectangular wave output signal according to the coding of the output signal of amplifier 45. Generators 49 and 50 then produce a series of pulses which are impressed upon code generator 52 through inhibit gate 51 causing code generator 52 to duplicate the code of code generator 13. The purpose of inhibit gate 51 and bit comparator 55 is to delay the time phase at the output of code generator 52 until it is synchronized with the code of the output of phase detector 48. Thus, code generator 52 provides an output code which becomes synchronized with the output of phase detector 48 within an average of one word period.

Figure 5:
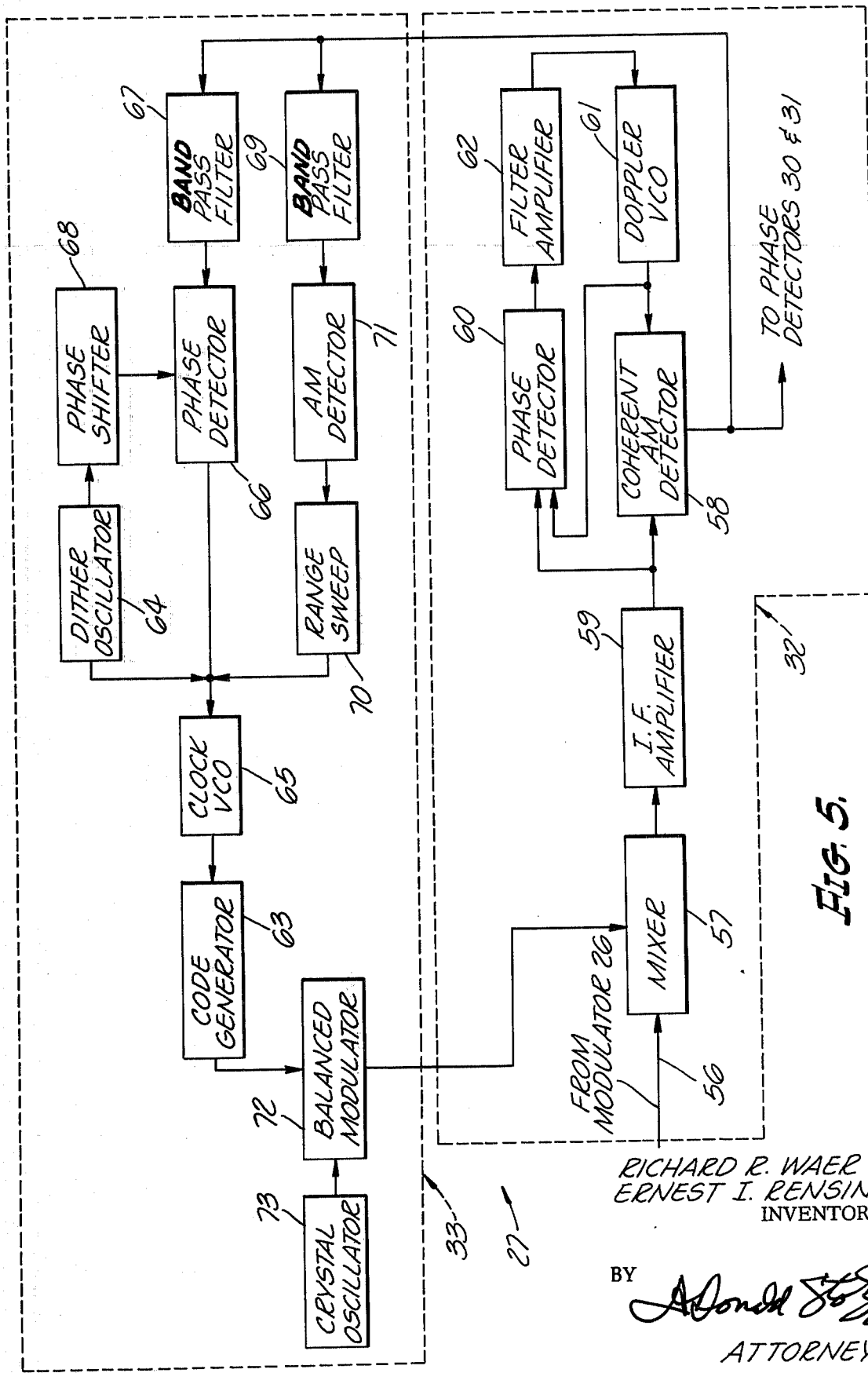
FIG. 5 is a block diagram of an output system shown in FIG. 3.

Output system 27 is shown in FIG. 5. As before, the main demodulator is indicated at 32; and the main decoder is indicated at 33. As is evident, demodulator 32 is not a conventional demodulator. However, all other blocks identified in the drawings herein as "modulator" or "demodulator" are relatively conventional.

Main demodulator 32 receives an input on a lead 56 from modulator 26 shown in FIG. 3. Decoding is produced by main decoder 33 which impresses a second signal on a mixer 57 which has a first input on a lead 56. The output of mixer 57 is impressed upon a coherent AM detector 58 through an IF amplifier 59. Detector 58 is a conventional synchronous detector. The output of amplifier 59 is also impressed upon a phase detector 60. The output of phase detector 60 is impressed upon a Doppler voltage-controlled oscillator (VCO) 61 through a filter amplifier 62.

The output of detector 58 is then a direct current signal having an alternating current ripple thereon. The output of detector 58 acts as a control signal for the first time phase adjustment of the code produced by a code generator 63 in main decoder 33. The code of the code generator 63 is controlled in a manner to be held synchronous and in the proper time phase with the code of a reflection from a distant target. Thus, when the average output of detector 58 is a maximum, the code of code generator 63 is in synchronism and in the proper time phase with the reflected signal code.

The time phase of the output code of code generator 63 is swept in a sinusoidal fashion over a range which is short in comparison to the shifting period of the shift registers in code generators 13, 55, and 63. This time phase sweep is produced by a dither oscillator 64 which operates a clock VCO 65 which in turn, supplies pulses to code generator 63.

The output of detector 58 is thus a direct current signal having a fundamental ripple frequency either the same as or twice the fundamental frequency of dither oscillator 64.

The output of detector 58 is impressed upon a phase detector 66 through a band pass filter 67. Phase detector 66 also receives a reference frequency from dither oscillator 64 through a ninety degree phase shifter 68. Phase detector 66 then servos clock VCO 65 with a varying direct current voltage so that the output code of code generator 63 is oscillated about a mean value at which the amplitude of detector 58 is a maximum. The output of phase detector 66 is zero when the output of coherent AM detector 58 is a maximum.

Band pass filter 67 is tuned to pass only the fundamental of the output signal of dither oscillator 64 and to reject the second harmonic thereof.

A band pass filter 69 is also connected from detector 58. Filter 69 rejects the fundamental frequency of dither oscillator 64 and passes only the second harmonic thereof. The second harmonic appears in the output of demodulator 58 when the midpoint of the swing of the phase of the output code of code generator 63 does not produce a maximum signal at the output of detector 58. The output of filter 69 operates to suppress the output of a range sweep 70 through an AM detector 71 when the servoing provided by phase detector 66 accurately controls the time phase of the output of code generator 63. If desired, range sweep 70 can simply provide a constant output voltage to clock VCO 65 to change the output frequency thereof until the input of filter 69 has increased to a predetermined maximum indicating substantial code synchronism. Range sweep 70 may then be gated off or suppressed by a limited negative bias in any conventional fashion by detector 71. For example, range sweep 70 may simply be an amplifier with a fixed bias sufficient to supply a constant voltage to clock VCO 65.

From the foregoing, it will be appreciated that the outputs of dither oscillator 64, phase detector 66, and range sweep 70 are added together to control clock VCO 65.

The output of code generator 63 is impressed upon a balanced modulator 72 that receives an output signal from a crystal oscillator 73. The output of the modulator 72 is impressed upon mixer 57.

In the operation of output system 27 shown in FIG. 5, coherent detector 58 produces an output signal proportional to reflected energy strength. The output of detector 58 is modulated according to the output of dither oscillator 64 and the transfer characteristic of the match or the mismatch of the output code of code generator 63 with the code on the incoming reflected signal. Range sweep 70 causes code generator 63 through clock VCO 65 to search for the synchronous time phase. When the time phase of the output code of code generator 63 is close to the proper time phase to match that of the code on the incoming reflected wave, filter 69 turns range sweep 70 off and phase detector 66 servos the time phase of the output code of code generator 63 so that it follows the time phase of the code on the incoming reflected wave.

As stated previously, each of the component parts of transmitter 10 may be conventional. Further, code generator 13 may be conventional as shown in FIG. 2. In FIG. 3, the entire system with the exception of spillover rejector 23 and output system 27 may also be conventional. Demodulator 24, notch filter 25, and modulator 26 may individually be conventional, although the combination objective and achievement thereof is novel.

Each of the individual blocks shown in FIG. 4 may likewise be entirely conventional although their combination is new. The same is true of all of the blocks shown in FIG. 5.

As stated previously, the system of the present invention will reject spillover noise due to direct radiation from antenna 14 to antenna 20 as well as reflections from objects close to these antennas.

If desired, spillover rejector 23 may be switched off or by-passed as the missile approaches intercept to improve sensitivity. Further, as the missile approaches intercept, antenna 20 may very well be oriented in a position away from transmitting antenna 14. Thus, if receiving antenna 20 is highly directional, only a small amount of spillover noise may be received through antenna 20.

All of the modulators and demodulators disclosed herein may be entirely conventional with the exception of main demodulator 32. All of such modulators and demodulators may be balanced modulators. All such modulators and demodulators other than main demodulator 32 also may be identical to transmitter modulator 12, as described previously. Thus, the terms "modulator" and "demodulator" are used primarily simply to describe functions rather than to distinguish them in structure.

Al of the code generators 13, 52, and 63 will have the same internal electrical connections, for example, as shown in FIG. 2. This means that the ouput code of each of these three code generators will be identical although the time phase of each will be different. For example, code generator 52 will have a time phase which will lag that of the code produced by code generator 13 due to a time delay which is incurred by transmission from transmitter 10 to receiver 19. Similarly, the time phase of the output code of code generator 63 will lag the time phase of the output code of code generator 13 by an amount approximately proportional to the distance of a target, or to the time required for a signal to travel from transmitter 10 and to a target and back to receiver 19.

A second notch filter may be placed after modulator 26 at the output of spillover rejector 23 in order to attenuate certain other undesired signal components entering output system 27. Thus, broadband spillover energy entering auxiliary demodulator 24 can leak through at a low level and thereby reach modulator 26 essentially unchanged. Modulator 26 will reconstitute this energy into a narrow band which can then be rejected by the second notch filter. Similarly, CW output from oscillator 11 can leak through modulator 12 and ultimately reach auxiliary demodulator 24 where it is broadbanded and passes through notch filter 25. Again, modulator 26 narrowbands this energy which can then be rejected by the second notch filter.

The specific arrangement of doubling and halving by doubler 46 and divider 47 to remove coding applies to a binary code only. The other arrangements can be made to affect other than binary codes.

Different uses for PN systems are disclosed in copending application Ser. No. 880,057 filed on Nov. 26, 1969 (now U.S. Pat. No. 3,641,573) by D. F. Albanese for a "Pseudonoise Radar System." Said copending application is hereby incorporated herein by this reference hereto as though fully set forth.

In FIG. 6, a transmitter 110 is connected to a transmitting antenna 111. Transmitter 110 includes a carrier oscillator 112, a code generator 113, and a modulator 114 which modulates the carrier signal at the output of oscillator 112 with the code of generator 113. Modulator 114 is connected from oscillator 112 and code generator 113 to antenna 111.

A receiver 115 is also shown in FIG. 6 connected from code generator 113 and a receiving antenna 116. Only the spillover rejector portion of receiver 115 is shown. Receiver 115 includes a delay device 117, a demodulator 118, a notch filter 119, and a remodulator 120. Any new or conventional PN receiver may be connected from the output of remodulator 120. Delay device 117 is connected from code generator 113 to demodulator 118 and remodulator 120. Demodulator 118 is connected from antenna 116 and delay device 117 to filter 119. Filter 119 is connected from demodulator 118 to remodulator 120. Remodulator 120 is connected from device 117 and filter 119.

Code generator 113 puts out a serial binary code in the form of a bilevel output signal. The code is generated over word intervals. When one word ends, the next word begins without any time lapse in between words. The code of one word is identical to that of each of the other words. The code of a word is, therefore, repeated over and over continuously. Modulator 114 simply reverses the phase of the output signal of oscillator 112 according to the code. That is, the transmitting antenna 111 receives a signal which is either in phase or 180 degrees out of phase with the output of oscillator 112, depending upon whether or not the bilevel output signal is high or low.

The coded carrier is then broadcast from transmitting antenna 111. Some of the broadcasted energy is reflected from a target to receiving antenna 116. Spillover is transmitted direct from antenna 111 to antenna 116.

The components 117, 118, 119, and 120 act as a spillover rejector. The desired signal induced by the wave reflected from the target and the spillover are passed through demodulator 118 to filter 119. Demodulator 118 decodes the spillover but not the desired signal. This is accomplished by making the time delay of delay device 117 equal to $d/c$, where $d$ is the distance between antennas 111 and 116, and $c$ is the velocity of light. What is meant by "decoding" is that the spillover energy is converted by demodulator 118 to a signal at its output of substantially a single frequency, i.e., the carrier frequency. The output of modulator 114 is very broadband. The desired signal, thus, comes in broadband. However, it is not decoded because delay device 117 must have a time delay directly proportional to target range for decoding, and it does not. The delay or transit time of the desired signal between antennas is equal to $Zr/C$, where $r$ is target range.

Thus, the input to notch filter 118 is a broadbanded, desired signal and a single frequency spillover. The notch filter 119 has a notch frequency equal to the carrier frequency and, thus, highly attenuates the spillover. The notch filter 119 does not attenuate the desired signal substantially because it only attenuates one frequency component thereof out of an extremely large number located over a very broad band. The notch filter 119, thus, selectively rejects most all of the spillover and passes most all of the desired signal.

The decoding done by demodulator 118 acts as an additional coding on the desired signal, which additional coding is preferably removed. This is done by remodulator 120.

Note that modulator 114, demodulator 118, and remodulator 120 may all be simple, conventional mixers.

It should be noted that the notch filter 119 must satisfy a set of conditions which are difficult to obtain in one unit. Because the PN technique always requires large bandwidth, B, in operation, the radio frequency (RF) carrier, $f_o$, must be at least at one half that bandwidth, most often at more than full bandwidth frequency. The rejection bandwidth must be well controlled in order to eliminate the RF and its adjacent noise bands without rejecting too great a portion of the desirable spread spectrum signal. Furthermore, its passband must extend at least one half the spread spectrum signal bandwidth on either side of the rejection band with very little attenuation and phase shift. FIG. 7 shows the desired frequency response of the notch filter 119. Attenuation is in decibels, dB. The notch filter 119 may sometimes be difficult and expensive to construct.

In accordance with the present invention, the need for notch filter 119 may be obviated. One other arrangement of the present invention is shown at 121 in FIG. 8. This arrangement may be substituted for all the structure shown in FIG. 6. Note that in FIG. 8, the following are provided: a carrier oscillator 122, a code generator 123, a modulator 124, a transmitting antenna 125, a delay device 126, a modulator 127, a receiving antenna 128, a demodulator 129, a high pass filter 130, and a remodulator 131.

Structures 122, 123, 124, 125, 128, 129, and 131 may be identical to structures 112, 113, 114, 111, 116, 118, and 120, respectively. Only certain connections are changed to accommodate added modulator 127. First, modulator 127 receives inputs from oscillator 122 and delay device 126. The output of modulator 127 is impressed upon demodulator 129 and remodulator 131. High pass filter 130, which may include a simple, conventional, DC blocking capacitor 132, replaces notch filter 119.

In the operation of the arrangement of FIG. 8, transmitting antenna 125 broadcasts a coded carrier as before. Receiving antenna 128 receives the desired signal reflected from a target and spillover. Demodulator 129 superimposes the spillover code at the time delay of delay device 126. Both the spillover and the desired signal have many frequency components over a large frequency spectrum before they are received. Since the delay of delay device 126 is not proportional to target range, the desired signal remains broadbanded at the output of demodulator 129. Since filter 130 is a high pass filter, the alternating current components of the desired signal are easily passed to remodulator 131 without substantial attenuation. Remodulator 131 then removes the additional or superimposed coding placed upon the desired signal by demodulator 129.

Due to the input from modulator 127, the energy in each frequency component of the spillover is combined into one signal of substantially one frequency by demodulator 129. However, this frequency is zero. This means that substantially all of the spillover at the output of demodulator 129 is in the form of direct current. Filter 130 then rejects substantially all of the spillover direct current because it is a high pass filter.

The spillover at the output of demodulator 118 appears as DC and a noise band, while the spread spectrum folds about the DC line and appears in bandwidth B/2 as shown in FIG. 7. The response of filter 130 is easily controlled. The passband thereof can also easily accommodate the desired signal. Remodulator 120 up-heterodynes the desired signal to RF as it was at the input to the spillover rejector. The simultaneous heterodyne decoding action in the demodulator 118 and remodulator 120 of the spillover rejector are achieved by feeding a biphase PN modulated RF signal into its local oscillator (LO) port rather than just the code as in the prior art. This modulated RF is obtained in the additional modulator 127 as shown in FIG. 8. The response of the high pass filter 130 is shown in FIG. 4. Attenuation is again in decibels, dB.

From the foregoing, it will be appreciated that modulator 127 may be a simple, conventional mixer. The substitution of the simple and inexpensive high pass filter 130 for the complex and expensive notch filter 119, thus, may be a substantial advantage. The addition of modulator 127, further, does not add substantially to the cost or complexity of the invention.

Note will be taken that the present invention not only applies to the type of carrier coding specifically described herein, but also to amplitude pulse time, pulse width, pulse frequency, and other frequency modulation.

Modulation when phase reversal is used may include a code bit frequency the same as, smaller than, or larger than the carrier frequency.

What is claimed is:

1. In a continuous wave pseudonoise guidance system having a transmitter source of an alternating signal, a transmitter modulator connected from said source to a transmitting antenna, and a transmitter code generator to operate said transmitter modulator in a manner to code said signal, a receiver comprising:
   a receiving antenna;
   a main demodulator;
   a main code generator to operate said main demodulator in a manner to reconstruct an alternating signal from a reflected wave corresponding to the output of said transmitter source;
   a main feedback circuit for synchronizing the output of said main code generator with the code of an incoming wave reflected from a distant target;
   an auxiliary demodulator connected from said receiving antenna;
   a notch filter located at the center of the transmission band and connected from said auxiliary demodulator;
   a receiver modulator connected from said notch filter to said main demodulator;
   an auxiliary code generator to operate both said auxiliary demodulator and said receiver modulator in a manner to pass coded waves reflected from distant targets to said main demodulator without considerable distortion while reconstructing coded spillover waves received directly from said transmitter or by reflection from objects near to said transmitter or receiver, said notch filter heavily attenuating reconstructed spillover waves while passing unreconstructed waves reflected from distant targets without considerable attenuation; and
   an auxiliary feedback circuit to synchronize the output of said auxiliary code generator with the code of a spillover wave, said auxiliary feedback circuit being substantially insensitive to the code of a wave reflected from a distant target due to the low signal strength thereof, all of said code generators being constructed to produce the same code, but shifted in phase.

2. The invention as defined in claim 1, wherein the phase of the transmitted signal is reversed according to a serial binary code, each of said modulators and demodulators being a double-pole, double-throw electronic switch, each said switch being adapted to reverse the respective connections of the inputs and outputs thereto, said code generators having bistable devices to operate said switches.

3. The invention as defined in claim 2, wherein said auxiliary feedback circuit includes a frequency doubler responsive to an incoming spillover wave, a frequency divider to halve the frequency of the output of said doubler, an auxiliary phase detector for comparing the input to said doubler with the output of said divider, a pulse generator at the output of said auxiliary phase detector, a phase-locked oscillator responsive to the output of said pulse generator for producing a series of output pulses, an inhibit gate connected between the output of said phase-locked oscillator and the said bistable device of said auxiliary code generator, and a comparison device responsive to the output of said phase detector and to the output of said auxiliary code generator for operating said inhibit gate each time the inputs to said comparison device are different from each other.

4. The invention as defined in claim 2, wherein said main feedback circuit includes a variable frequency oscillator to oscillate the switching frequency of the said main code generator bistable device, first means to develop a control signal which increases positively or negatively when the decoded output of said demodulator recedes from a maximum value, a dither oscillator to modulate the frequency of said variable frequency oscillator, and second means responsive to said control signal for varying the center frequency of said frequency modulation to maintain the amplitude of said control signal equal to zero at the center frequency of said modulation.

5. The invention as defined in claim 4, wherein said first means includes third means responsive to the output of said main demodulator for producing an output reference signal of a constant amplitude having a frequency the same as the output signal of said main demodulator, and a first main phase detector responsive to the output of said main demodulator and said reference signal for producing said control signal, said second means including a band pass filter responsive to said control signal for passing the fundamental dither frequency and rejecting the second harmonic thereof, a ninety degree phase shifter responsive to the output of said dither oscillator for shifting the phase thereof, a second main phase detector responsive to the outputs of said phase shifter and said band pass filter for maintaining the center frequency of said variable frequency oscillator at a value to keep the amplitude of said control signal at zero, said main feedback circuit also including fourth means to supply a signal to said variable frequency oscillator to sweep the frequency thereof, a band pass filter responsive to said control signal for passing the second harmonic of said dither frequency and for rejecting the fundamental thereof, and fifth means responsive to the output signal amplitude of said band pass filter for reducing said sweep signal toward zero when the second harmonic of said dither frequency appears in the output of said first means.

6. The invention as defined in claim 5, wherein said auxiliary feedback circuit includes a frequency doubler responsive to an incoming spillover wave, a frequency divider to halve the frequency of the output of said doubler, an auxiliary phase detector for comparing the input to said doubler with the output of said divider, a pulse generator at the output of said auxiliary phase detector, a phase-locked oscillator responsive to the output of said pulse generator for producing a series of output pulses, an inhibit gate connected between the output of said phase-locked oscillator and the said bistable device of said auxiliary code generator, and a comparison device responsive to the output of said phase detector and to the output of said auxiliary code generator for operating said inhibit gate each time the inputs to said comparison device are different from each other.

7. In a communication system for simultaneously receiving a noise signal and a desired signal in relatively broad overlapping bands, the combination comprising: first means responsive to both of said responsive signals for collapsing the energy of said noise signal into a direct-current signal of substantially a single frequency without collapsing the energy of said desired signal into a direct-current signal, said first means producing substantially said single frequency direct-current signal and said desired signal at the output thereof; and second means responsive to said first means output signals for selectively attenuating said direct-current signal more than said desired signal.

8. The invention as defined in claim 7, wherein said noise signal and said desired signal are pseudonoise coded signals, the coding of said signals being identical except that the code of one of said noise and desired signals at the location of said first means has a phase different from that of the other, said first means including third means responsive only to a code of the phase as that of said noise signal for decoding only said noise signal.

9. The invention as defined in claim 8, wherein said third means impresses a further coding on said desired signal by decoding said noise signal, the output of said second means being substantially only said double coded desired signal, and fourth means responsive to the output of said second means for removing at least the one desired signal coding placed thereon by said third means.

10. The invention as defined in claim 8, wherein said first means includes fourth means to supply said noise code to said third means.

11. The invention as defined in claim 10, wherein said fourth means includes means responsive to said noise signal itself for producing said noise code.

12. The invention as defined in claim 10, wherein said fourth means includes a transmitter code generator located at a common broadcast point of said noise and desired signals, and a delay device connected between said code generator and said third means, said device having a delay approximately equal to $d/c$, where $d$ is the distance between said point and said third means, and $c$ is the velocity of light.

13. The invention as defined in claim 8, wherein said third means includes a first mixer having one input to receive said noise and desired signals, said first mixer also having another input, and fourth means to provide a carrier to said other input coded with the same said noise code, said second means including a high pass filter.

14. The invention as defined in claim 13, wherein said high pass filter includes a series-connected, direct-current blocking capacitor.

15. The invention as defined in claim 13, wherein said fourth means includes a second mixer, a transmitter oscillator to provide one input to said second mixer, a transmitter code generator, a delay device connected between said generator and said second mixer, said second mixer having its output connected to said other input of said first mixer, said device providing a delay of about $d/c$, where $d$ is the distance between transmitter and receiver, and $c$ is the velocity of light.

16. In a pseudonoise receiving system which simultaneously receives a desired relatively weak coded signal and a relatively strong identically coded but phase shifted spillover coded signal, both modulated onto radio frequency carriers thereby both producing relatively broad overlapping spectra, the combination comprising:

first means for detecting and synchronously decoding said spillover signal without decoding the differently phased desired signal, said decoded spillover signal occupying a relatively narrow spectrum and remaining in the signal path containing said desired signal;

second means for collapsing a portion of the spectrum of all signals within said signal path, said collapsing reducing said decoded spillover signal to a substantially single frequency signal thereby greatly reducing its signal energy without significantly reducing the much broader spectrum of said desired signal;

and means for synchronously decoding said desired signal.

17. Apparatus according to claim 16 including third means responsive to said spillover signal to produce a reference code within said first means for decoding only said spillover signal, said third means operating to impress said reference code on said signal path.

18. Apparatus according to claim 17 in which said means for producing a reference code includes transmitted code generating means within the transmitter at a common transmission point from which said desired and spillover signals originate and a delay device connected between said transmitted code generating means and said third means, said device having a delay approximately equal to $d/c$, where $d$ is the distance between said point and said third means and $c$ is the velocity of light.

19. Apparatus according to claim 18 in which said means for collapsing a portion of said spectrum of all signals within said signal path comprises a notch filter substantially centered on said single frequency signal.

* * * * *